United States Patent Office 3,480,064
Patented Nov. 25, 1969

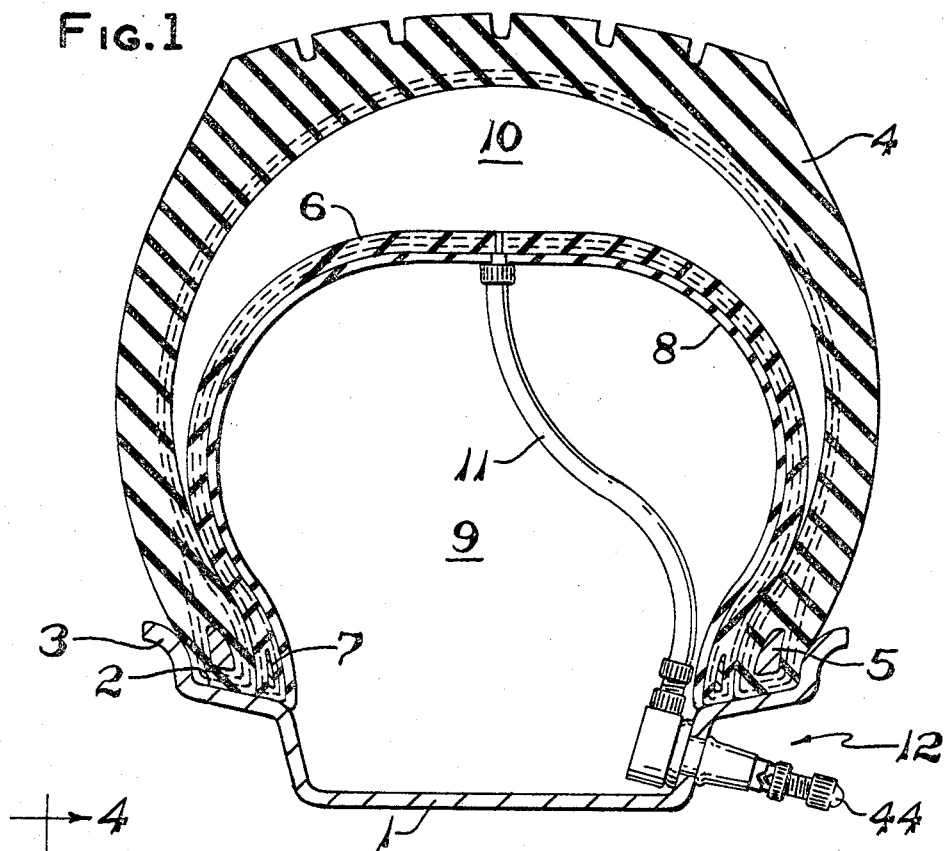
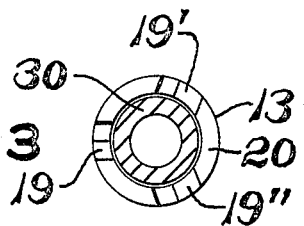
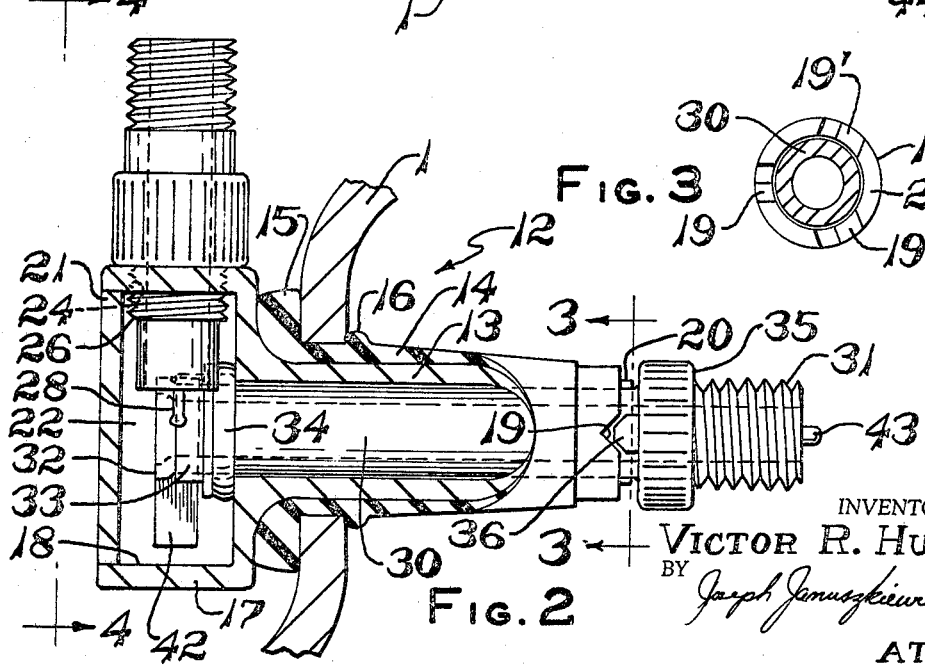

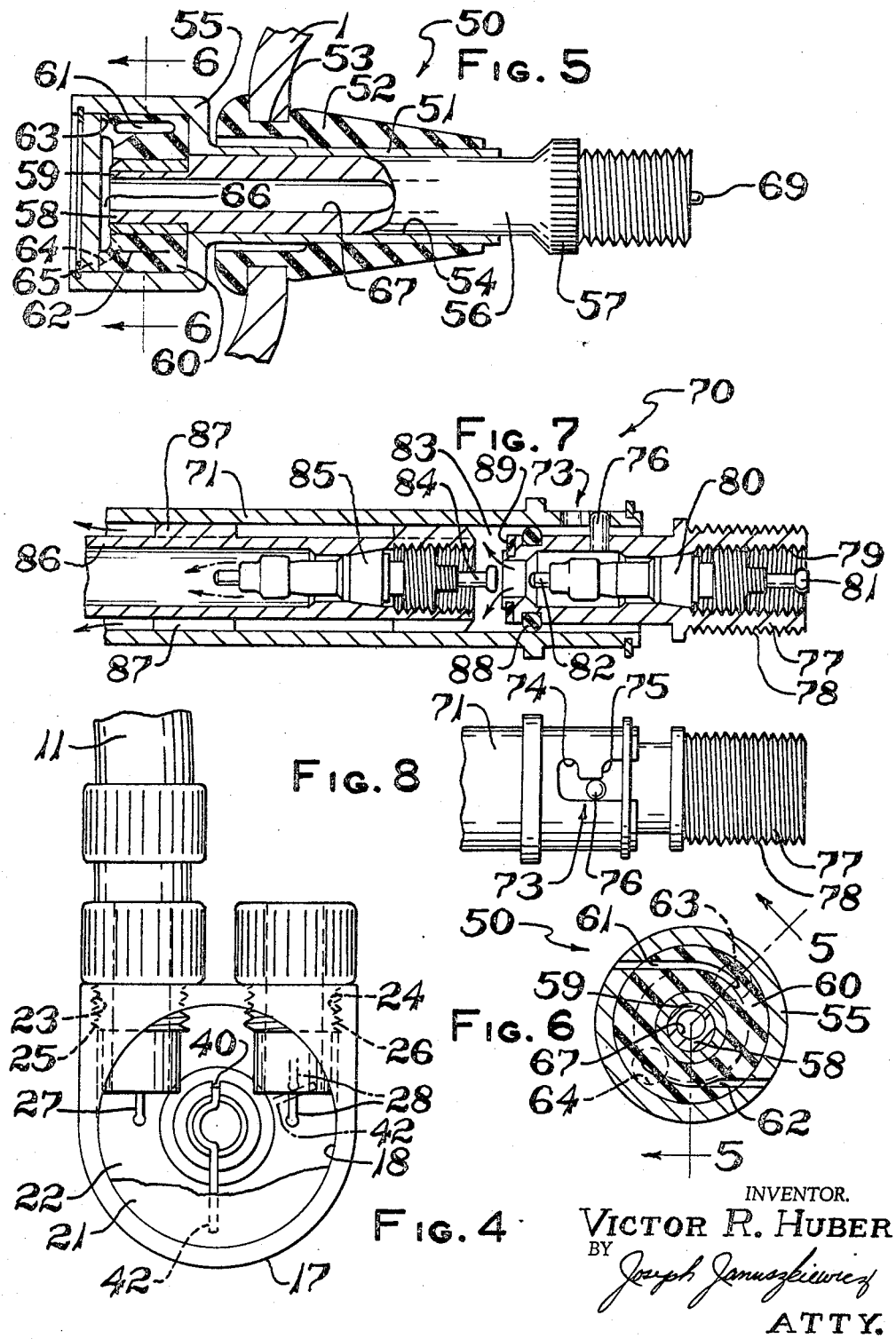

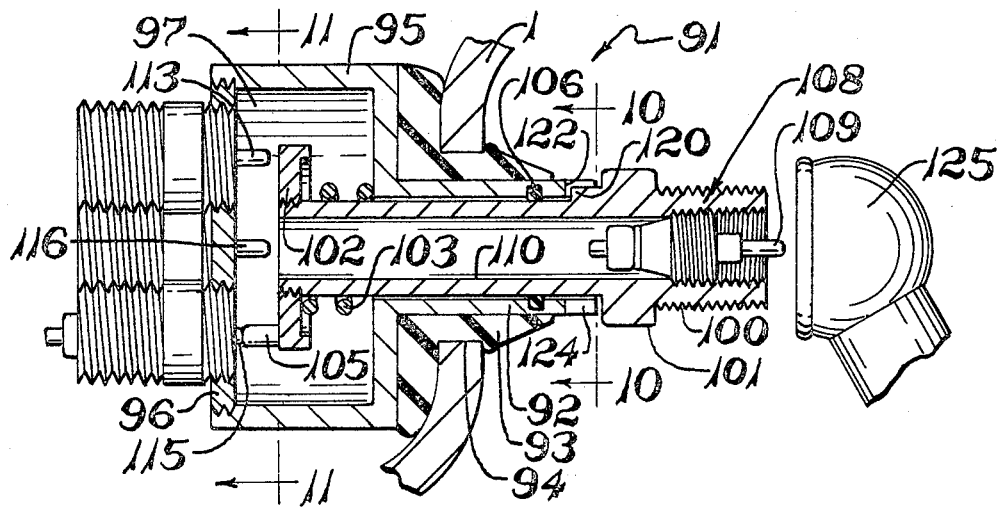
Fig. 9
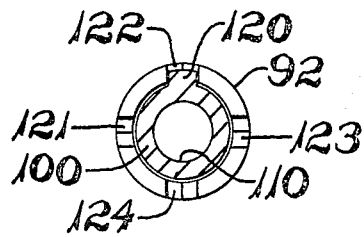
Fig. 10
Fig. 11
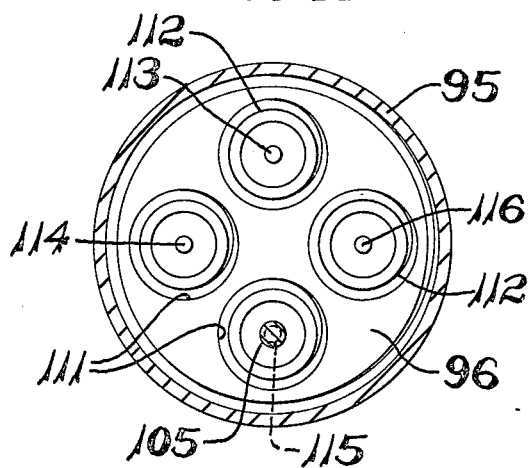
INVENTOR.
VICTOR R. HUBER
BY
ATTY.

3,480,064
DUAL CHAMBER TIRE AND INFLATING MEANS
Victor R. Huber, Akron, Ohio, assignor to The B. F. Goodrich Company, New York, N.Y., a corporation of New York
Filed May 23, 1967, Ser. No. 640,688
Int. Cl. B60c 5/04
U.S. Cl. 152—340                                 5 Claims

ABSTRACT OF THE DISCLOSURE

A safety tire having in inner tire mounted in an outer tire with a valve operative to provide selective gauging, deflation or pressurization of the respective dual chambers defined by the outer tire, inner tire and the rim.

Background of the invention

This invention relates to a tire and more particularly to a safety tire having an inner tire mounted in an outer tire and cooperative with a valve that provides selective inflation or deflation of the separate chambers formed by the outer tire, inner tire, and the rim which receives such tires.

In dual chamber tires where the chambers are structurally separate, it is advantageous to provide a single valve means through which it is possible to inflate, deflate and gauge such chambers separately. Separate valves have been used for the separate inner and outer tires; however, such means is expensive and impractical as it requires special rims and accessories. Others have proposed to use a valve structure that has two separate air valves operating through two separate air passages; however, in view of the standardization in the industry, a redesign of the rim to accommodate such change would be impractical.

To provide a solution to the above problems, the present invention provides a dual chamber tire having a valve that is economical to manufacture, simple and useable on the ordinary conventional rim whether such be standard passenger, airplane or truck rim, facilitating the gauging, inflating and deflating of either chamber quickly and without difficulty. No special tools are necessary to operate such valve structure, and there is no leakage between chambers through such valve structure. Such valve is adaptable for use with a multichamber tire assembly while mounting a positive seal for all such chambers.

Brief summary of the invention

The present invention contemplates the use of a movable valve stem cooperative with a control element that selectively moves the stem for communicating a common air chamber with a pair of spaced standard core valves or adaptable for use with any number of spaced ports which provide selective inflation and deflation of the spaced chambers as well as the gauging thereof.

Brief description of the drawings

FIG. 1 is a cross-sectional view of a safety tire embodying the invention.

FIG. 2 is a cross-sectional view on enlarged scale of the valve shown in FIG. 1.

FIG. 3 is a fragmentary cross-sectional view of tire valve along line 3–3 of FIG. 2 showing the forward portion only of the valve for clarity.

FIG. 4 is a fragmentary front elevational view of the tire valve taken along line 4—4 of FIG. 2 with a cover plate removed for clarity.

FIG. 5 is a cross-sectional view of a modified form of a safety tire embodying the invention.

FIG. 6 is a cross-sectional view of the modified form of tire valve taken along line 6–6 of FIG. 5.

FIG. 7 is a cross-sectional view of a modified form of tire valve.

FIG. 8 is a plan view of the one end portion of the tire valve shown in FIG. 7.

FIG. 9 is a cross-sectional view of a modified form of tire valve.

FIG. 10 is an end view of the valve body taken along line 10–10 of FIG. 9.

FIG. 11 is a cross-sectional view of the tire valve shown in FIG. 9 taken along line 11–11 of FIG. 9.

Referring to the drawings and more particularly to FIG. 1 there is shown a tire rim 1 having spaced bead seats 2 with retaining flanges 3 adjacent thereto. A tubeless outer tire 4 having bead 5 is mounted on the rim 1. An inner tire 6 having beads 7 and rubberized reinforced material such as fabric extending therethrough has the edges thereof seated adjacent to the respective edges of the outer tire 4 on the bead seats 2. A butyl liner 8 is formed with the inner tire 6 which in cooperation with the rim 1 defines an inner chamber 9. A chamber 10 is defined by the inner tire 6 and the outer tire 4, which chamber 10 is adapted to be connected via a hose 11 and valve 12 to a suitable pressure source.

Valve 12 (FIG. 2) has an outer longitudinally extending tubular valve body 13 which has its intermediate portion encased within a rubberized seal 14. Seal 14 has its one end portion enlarged as at 15 with a ribbed portion 16 closely adjacent thereto, to define a recessed portion therebetween, which recessed portion is received by the hole in the conventional tire rim 1.

Valve body 13 has one end portion enlarged as at 17 to define a recess 18 with the other end portion thereof having a plurality of spaced V-shaped notches 19, 19' and 19" on the end portion thereof with a raised portion 20 between notches 19' and 19" for a purpose to be described. Such one end portion of the valve body 13 has a plug 21 covering such recess 18 to define a chamber 22. Such enlarged end portion 17 has a pair of threaded bores 23 and 24 which threadedly receive nipples 25 and 26 (FIG. 4) which in turn have mounted therein a standard tire valve core which as shown in FIG. 4 have outwardly extending stems 27 and 28. Nipple 25 is connected via hose 11 to the outer chamber 10 while nipple 26 is adapted to provide pressurized air for the valve chamber 9.

Rotatably mounted within the central bore of valve body 13 is a valve stem 30, which valve stem 30 has one end threaded as at 31 and the other end flared as at 32 to retain on the end portion thereof a washer 33 and a rubber seal 34. Seal 34 is sufficiently resilient to permit limited axial movement of the valve stem 30. The one end portion of valve stem 30 has a knurled knob 35 secured thereto with an axially extending projection 36 which is adapted to enter the V-shaped notches 19, 19' or 19". As shown in FIG. 2, the projection 36 is received by the notch 19 which represents the neutral position of the valve stem 30. By exerting an axial outward pressure on valve stem 30, in a rightward direction as viewed in FIG. 2, rubber seal 34 would permit the axial movement of such valve stem 30 and by rotation of the knurled knob 35, projection 36 is adapted to be rotated in either a clockwise direction or a counterclockwise direction such that the projection 36 is adapted to be received by the V-shaped notches 19' or 19". The raised portion 20 would prevent rotation of the projection 36 beyond V-shaped notches 19' or 19" which serves as a safety feature to prevent breaking of stems 27 or 28. Flared end portion of valve stem 30 and washer 33 are recessed as at 40 (FIG. 4) to receive a spring steel projection 42 which is adapted to be rotated by the valve stem 30 such that its outward end portion is adapted to selectively contact the stems 27 or 28 for a purpose to be described. The one end portion of valve stem 30 is internally threaded to receive a standard valve cord which, as shown in FIG. 2, has a valve stem 43 projecting outwardly therefrom. The standard valve cores referred to are of conventional construction, available commercially on the market and therefore not described in detail.

In the operation of the apparatus described, assuming the removal of the valve cap 44 and that the valve stem 30 is in the position shown in FIG. 2 such that the projection 42 extends in an intermediate position out of contact with stems 27 or 28, the operator positions the standard inflating nozzle as shown in FIG. 9 such that projecting valve stem 43 will be depressed to thereby pressurize the central passageway of valve stem 30 which is adapted to pressurize chamber 22 as defined by the recess 18 within enlarged end portion 17 of the valve body 13. Upon rotation of the knurled knob 35, stem 27 is adapted to be depressed by the projection 42 communicating the pressurized source with chamber 22 to thereby pressurize chamber 10 via hose 11 to the desired pressure. With the knurled knob 35 with its projection 36 locked in the position projection 42 maintains valve stem 27 in a depressed condition permitting gauging of chamber 10. After pressurization of the chamber 10 to the desired pressure, knurled knob 35 would be rotated in an opposite direction to move projection 42 into abutting contact with stem 28 to thereby depress stem 28 to provide communication between the chamber 9 and the chamber 22, as well as the central passageway of the valve stem 30 such that chamber 9 can be pressurized by the inflating nozzle. Such action additionally cuts off communication between the chamber 10, chamber 22 and the central passageway of the valve stem 30. Gauging of chamber 9 may be done in the conventional manner. Upon pressurization of the chamber 9 to the desired pressure, knurled knob 35 would then be rotated such that the projection 42 will be mid-way between the respective stems 27 and 28 such that the projection 36 is received by V-notch 19.

A modification of the tire valve is shown in FIGS. 5 and 6 wherein such tire valve 50 has an outer longitudinally extending tubular valve body 51 which has its intermediate portion encased within a rubberized seal 52. Seal 52 is conically shaped with an annular recessed portion 53 which receives and sealingly engages the standard rim 1 as shown in the original embodiment. Valve body 51 has a central bore 54 extending longitudinally therethrough and with the one end portion thereof terminating into an enlarged hub portion 55. Rotatably mounted within the central bore 54 of valve body 51 is a valve stem 56 which has a knurled portion 57 at one end thereof and a reduced eccentric end portion which as shown in FIG. 5 has its thickened or enlarged portion 58 (FIG. 6) at the lowermost end portion thereof and the thin walled portion 59 at the upper end portion thereof. Suitably secured to the inner wall of hub portion 55 is an annular molded rubber member 60, which member 60 has a pair of horizontally extending passageways 61 and 62 extending therethrough (see FIGS. 5 and 6). Such horizontally extending passageways 61 and 62 are adapted to communicate with passageways 63 and 64 respectively which are shown in dotted outline in FIG. 6 which passageways are adapted to communicate respectively with separate chambers 9 and 10 as in FIG. 1 of a dual chambered tire. A plug 65 is mounted on the one end portion of the hub 55 which in cooperation with the annular rubber member 60 defines a chamber 66 which is in communication with the longitudinally extending central passageway 67 of valve stem 56. The outwardly extending valve portion of valve stem 56 is internally threaded to receive a standard valve core which as shown in FIG. 5, has an outwardly extending stem 69. Through the use of a conventional inflating hose and nozzle such stem 69 is adapted to be depressed to permit pressurization of the central passageway 67 and the chamber 66.

In the operation of the tire valve 50, valve stem 56 is adapted to be rotated such that the enlarged portion 58 is adapted to exert a force on the molded rubber member 60 to selectively close either passageways 61 or 62. With the enlarged portion as shown in FIGS. 5 and 6, passageway 62 is closed off and pressurized fluid via central passageway 67 is adapted to communicate with the passageways 61, 63 to the chamber connected thereto. Rotation of the valve stem 56 such that the enlarged portion 58 is rotated 180° opposite to that shown in FIG. 6, will operate to close passageway 62 and open passageway 61 such that the pressurized air through central passageway 67 is adapted to pressurize the chamber that is in communication with the passageways 61 and 63.

A modification of the tire valve is shown in FIGS. 7 and 8 wherein a tire valve 70 is adapted to be mounted to the tire rim of a dual chambered tire. Such tire valve 70 has a longitudinally extending valve body 71 with a central bore 72 extending longitudinally therethrough. Such tire valve body 71 may be mounted in a rubberized plug for connections to the rim 1 or in any other suitable manner as is old and well known in the art, such as a long stem to the central portion of a standard wide base truck rim and thence radially upwardly through the rim. One end of such tire valve 70 has a U-shaped recess 73 (FIG. 8) with leg portions 74 and 75 adapted to selectively receive a pin 76 mounted in a tubular control valve member 77. The outermost end portion of tire valve 70 has a snap-on retaining ring (FIG. 8) which confines the outward movement of pin 76 thereby restricting such movement between the respective leg recess portions 74 and 75 for a purpose to be described. The outermost end portion of control valve member 77 is externally and internally threaded as at 78 and 79 respectively. Externally threaded portion 78 receives the conventional valve cap to protect a standard tire valve core 80 which is threadedly secured to the internally threaded portion 79. One end portion of valve core 80 has a valve stem 81 which extends outwardly therefrom to control the inflation and deflation of the central bore 72 in the conventional manner via an inflating nozzle. The other end portion of valve core 80 has an outwardly extending projection 82 which is adapted to contact a stem 84 of a conventional standard valve core 85 which is threadedly secured to a tubular member 86 which in turn is mounted within the central bore 72 of valve body 71. The clearance space in bore 72 between valve core 85 and valve core 80 defines a chamber 83. Tubular member 86 has a plurality of outwardly extending webs 87 which properly position and space such member within valve body 71 to permit passage of air therebetween as shown by the arrows in full line of FIG. 7, yet maintain such member 86 in axial position relative to valve body 71. Control valve member 77 has an O-ring 88 mounted on the innermost peripheral end portion which abuttingly engages the peripheral portion of the central passageway 72 to provide an air seal for chamber 83 defined by such central passageway 72 between the respective valve core members 80 and 85. In addition, control valve member 77 has a flat annular seal member 89 on the end portion thereof which is adapted to abuttingly engage the end portion of the tubular member 86 when the pin 76 of such control valve member 77 is in leg portion 74 of recess 73.

In the operation of the tire valve as described above the operator may selectively position control valve member 77 axially inwardly or outwardly until pin 76 is positioned within leg portions 74 or 75 of recess 73. With pin 76 positioned in leg portion 75, the respective valve cores 80 and 85 are substantially in the positions shown in FIG. 7 wherein the projection 82 of valve core 80 is out of contact with the stem 84 of valve core 85. Upon pressurization of chamber 83, the clearance space between valve cores 80 and 85 through a conventional pressure hose which depresses stem 81, pressurized fluid flows through valve core 80 pressurizing chamber 83 and flows between a clearance space provided by the tubular member 86 and valve body 71 to pressurize one of the dual chambers of the tire. Upon release of stem 81, the pressure in such pressurized chamber will be stabilized and be maintained at such preset level. In rotating control valve member 77 and axially moving such valve member until pin 76 is positioned within leg portion 74 of recess 73, projection 82 on valve core 80 will depress stem 84 of valve core 85 conditioning the pressurization or deflation of the other of the dual chambers of the tire. Upon pressurization of chamber 83 through the use of a conventional pressure nozzle, pressurized fluid will flow through both valve cores 85 as depicted by the dashed arrows in FIG. 7. Gauging is accomplished in a conventional manner as well as deflation of such chambers by the manipulation of control valve member 77 for selectively moving such member 77 inwardly or outwardly such that the stem 84 may be depressed or released.

A further modification of the tire valve is shown in FIGS. 9, 10 and 11 wherein a tire valve 91 has an outer longitudinally extending tubular valve body 92 which has its intermediate portion encased within a rubberized seal 93. Seal 93 is conically shaped with an annular recessed portion 94 which receives and sealingly engages the standard rim 1 as shown in the original embodiment. Valve body 92 has a central bore extending longitudinally therethrough and with the one end portion thereof terminating into an enlarged hub portion 95, which portion 95 cooperates with an annular plate 96 (FIG. 11) to define a chamber 97. Axially movable within the central bore of valve body 92 is a valve member 100 which has an enlarged portion at its forwardmost end portion as at 101 to limit the axial movement of such valve member 100 into the central bore of valve body 92. The other end portion of valve member 100 threadedly receives an annular flange 102 which provides a seat for a spring 103 which biases valve member 100 inwardly (leftwardly as viewed in FIG. 9). Annular flange 102 has a projection 105 which extends in an axial direction for a purpose to be described. The intermediate portion of valve member 100 is suitably recessed to peripherally receive an O-ring seal 106 which abuttingly contacts the peripheral surface of the central bore of the valve body 92 to prevent the passage of fluid therethrough. Threadedly mounted in the one end portion of a central passageway 110 of valve member 100 is a valve core 108 with an outwardly extending stem 109, which stem 109 is adapted to be depressed by contact with the pin of an inflating nozzle for pressurizing such central passageway 110 of valve member 100. Annular plate 96 has a plurality of bores 111 which are located substantially 90° from each other relative to the center of such plate 96. Each bore 111 is threaded to receive a nipple 112 which in turn receives a conventional valve core having the respective stems 113, 114, 115 and 116 projecting outwardly into chamber 97. Such stems 113–116 are adapted to be seriately depressed or selectively depressed by the axially extending projection 105 of valve stem 100. The respective nipples 112 are adapted to be connected to different chambers and if desired a safety tire may be constructed having a plurality of chambers which in the instance to conform with the disclosure of FIG. 9 would be a four chambered tire such that the respective chambers would be separately inflated and spaced from each other to provide additional safety in the prevention of blowouts. However four valve stems are disclosed as an example only and further, such chambers may be associated with devices other than tires wherein it is desired to separately control through a simple inexpensive valve the inflation and deflation of a plurality of chambers. To assure proper alignment of the projection 105 and the respective stems 113 through 116 respectively, the outer end portion of valve member 100 has a projection 120 which is adapted to selectively engage V-shaped notches 121, 122, 123 or 124 as shown in FIG. 10. Such notches 121–124 inclusive are located 90° apart and in alignment with the respective nipples 112.

In the operation of the tire valve as shown in FIGS. 9 through 11, valve member 100 is axially moved relative to the valve body 92 such that the projection 120 clears the outer edge portion of valve body 92 to permit the relative rotation therebetween such that the projection 120 may register selectively with one of the V-shaped notches 121 through 124 inclusive. Upon proper selection of the notch, the valve member 100 is released so that the projection 120 will register with the notch, with spring 103 biasing such valve member inwardly causing projection 105 to depress the stem 115 of the standard valve core thereby opening communication between the chamber 97 with the chamber that is connected therethrough via the valve core cooperating with such stem 115. An inflating nozzle 125 depressing valve stem 109 is adapted to pressurize the central passageway 110 of valve member 100 along with chamber 97 and the chamber corresponding to the valve core that is operative through such valve stem 115. The other chambers may be inflated in a similar manner through selective axial movement and rotation of the valve member 100 with the selective depressing of the stem associated with the selective chambers desired to be inflated.

Various modifications are contemplated and may obviously be resorted to by those skilled in the art without departing from the spirit and scope of the invention, as hereinafter defined by the appended claims, as only preferred embodiments thereof have been disclosed.

I claim:

1. A safety tire having an outer tire member and an inner tire member mounted therein; said inner and outer tire members being mounted onto a vehicle rim to define a pair of closed chambers; a valve member attached to said inner tire and extending through an opening in said rim; said valve member having a valve body; said valve body having a pair of bores on one end portion thereof communicating through valve cores with said chambers; each valve core having a valve stem operative upon actuation to communicate pressurized fluids therethrough; a tubular valve member rotatably mounted in said valve body; one end portion of said valve member having a valve core mounted therein to control the passage of air therethrough; the other end portion of said valve member having a radially extending projection operative to selectively engage and depress said valve stems to provide selective communication therethrough with said chambers.

2. A safety tire as set forth in claim 1 wherein said valve member has projection selectively cooperable with a plurality of recesses on said valve body to maintain said valve member and valve body in present relationship.

3. A tire valve for use in inflating an inner chamber and an outer chamber comprising a valve body, said valve body having an intermediate portion adapted to be mounted in an opening in the rim carrying the tire, said body having a passageway extending longitudinally therethrough, one end portion of said passageway being threaded, the other end portion of said passageway opening into communication with a chamber cavity, said valve body having a pair of nipples communicating with said chamber cavity, each of said nipples having a standard valve core with a valve stem projecting therefrom for opening communications therethrough, a valve stem rotatably mounted in said passageway for limited axial and rotative movement therein, said valve stem having a central bore therein, said valve stem having a valve core in one end portion thereof for controlling the pressurization of said bore, the other end portion of said valve stem having a projection mounted thereon for movement into contact with either of said valve stems.

4. A tire valve as set forth in claim 3 wherein said valve body has a plurality of spaced recesses, said valve stem has an abutment thereon operative to register selectively with said recesses controlling the rotation of said projection for selective engagement with said valve stems on said standard valve cores.

5. A tire valve as set forth in claim 3 wherein said valve body has a raised portion between a pair of said recesses to prevent complete rotation of said valve stem.

References Cited

UNITED STATES PATENTS

| 1,469,927 | 10/1923 | Kraft | 152—340 |
| 3,037,544 | 6/1962 | Gouirand | 152—415 |
| 3,217,733 | 11/1965 | Howard | 152—427 XR |

ARTHUR L. LA POINT, Primary Examiner.

CHARLES B. LYON, Assistant Examiner.

U.S. Cl. X.R.

137—323; 152—415, 427

PO-1050
(5/69)

UNITED STATES PATENT OFFICE
CERTIFICATE OF CORRECTION

Patent No. 3,480,064          Dated November 25, 1969

Inventor(s)     Victor R. Huber

It is certified that error appears in the above-identified patent and that said Letters Patent are hereby corrected as shown below:

Column 1, line 12, "in" should read ---an---.
Column 3, line 9, "cord" should read ---core---.
Column 4, line 27, "connection" should read ---connections---.
Column 6, Claim 2, line 59, "present" should read ---preset---.

SIGNED AND
SEALED
MAR 10 1970

(SEAL)
Attest:

Edward M. Fletcher, Jr.
Attesting Officer

WILLIAM E. SCHUYLER, JR.
Commissioner of Patents